Feb. 27, 1940.  N. P. HARSHBERGER ET AL  2,191,465
SURFACE COVERING MATERIAL
Filed June 23, 1936   2 Sheets-Sheet 1
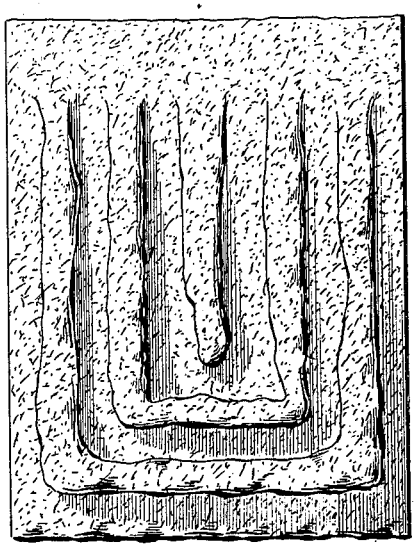
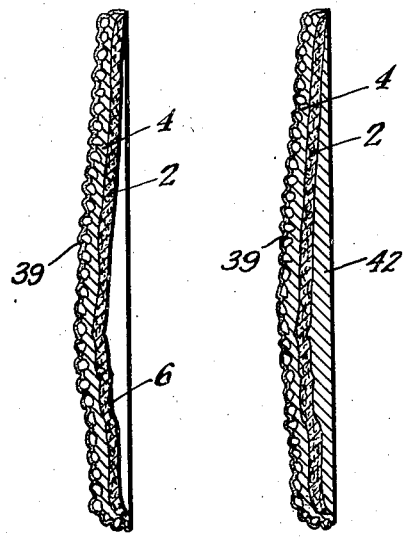
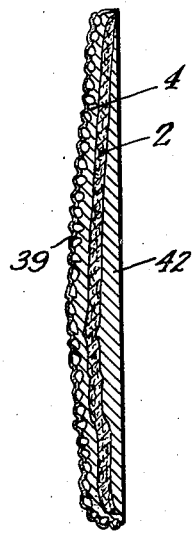
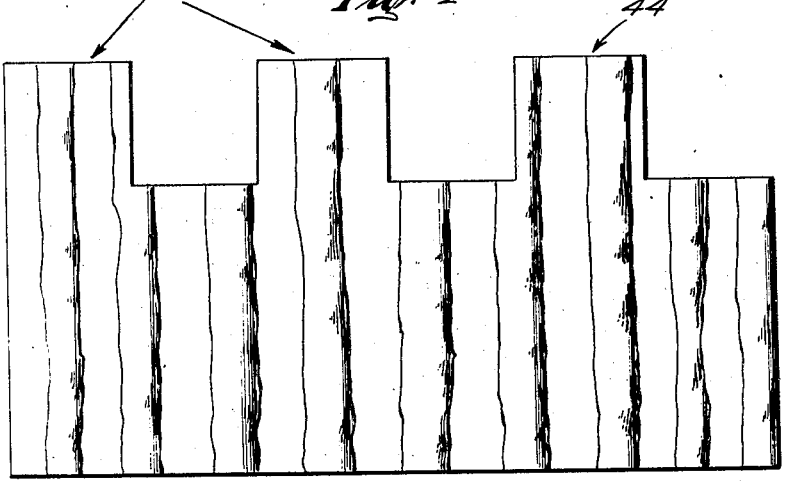
INVENTORS
Norman P. Harshberger
BY Sidney A. Ochs
Fred. W. Dodson.
ATTORNEY

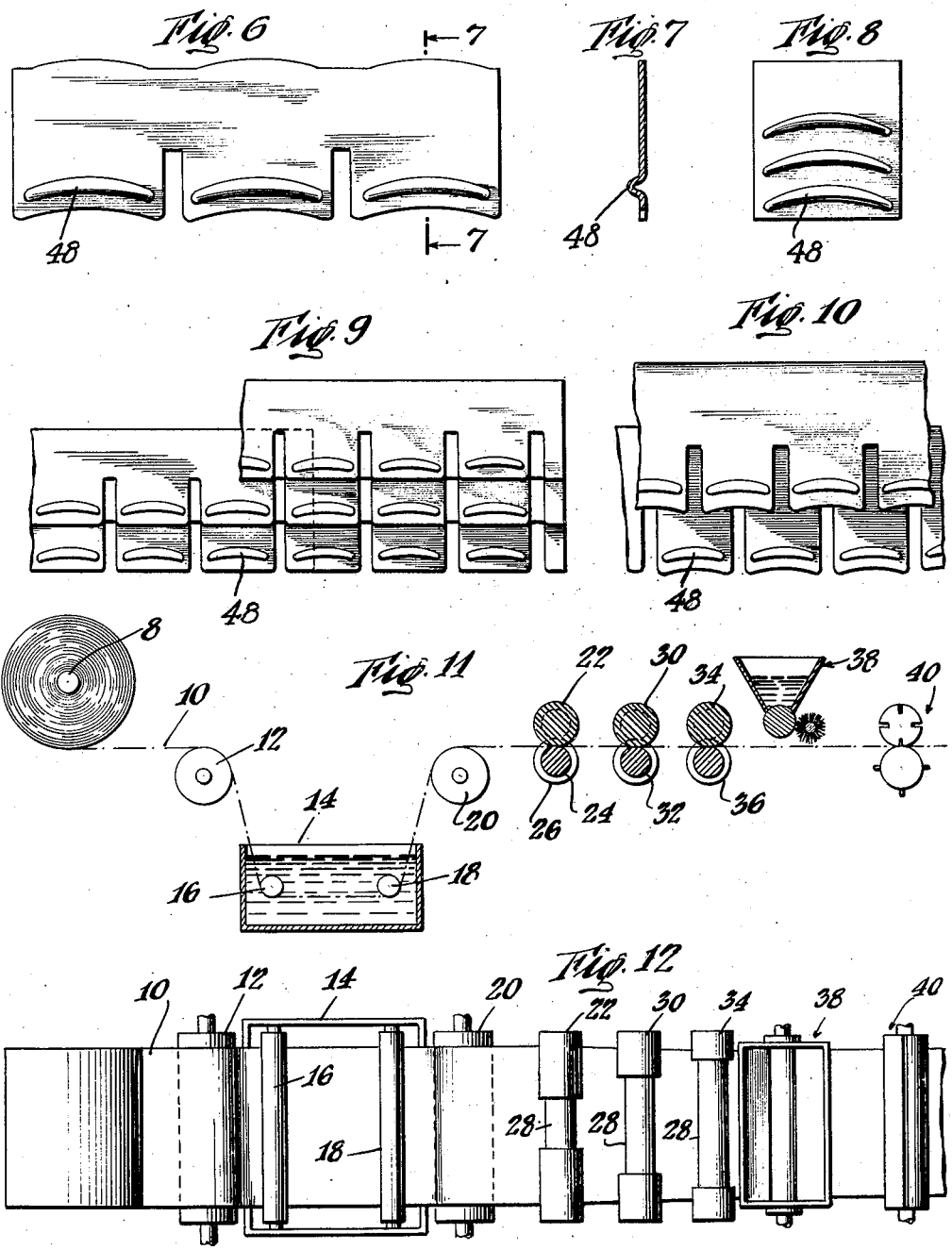

Patented Feb. 27, 1940

2,191,465

UNITED STATES PATENT OFFICE 2,191,465

SURFACE COVERING MATERIAL

Norman P. Harshberger, Scarsdale, and Sidney A. Ochs, New York, N. Y., assignors to Bakelite Building Products Co., Inc., New York, N. Y., a corporation of Delaware Application June 23, 1936, Serial No. 86,876

11 Claims. (Cl. 108—8)

This invention relates to materials intended for exposure to weather or subject to wear, and for that purpose provided with protective coatings or layers. Also, the invention has reference to materials of this character wherein a base, before or after one or more protective coatings are applied is formed or raised as by embossing, and or corrugating, to impart pleasing visual effects and physical improvements to the finished product.

Materials as these find application, for instance, as coverings for roofs, walls, and the like. More particularly the invention relates to products and processes intended for roofing and siding involving fibre base materials, for instance, composition material of the character shown and described in Harshberger Patent No. 1,913,667, granted June 13, 1933, to which the novel features of our invention have been imparted and the following description is therefore more specifically addressed to these embodiments.

Roofing elements with raised areas produced by molding and processing bituminous mastic compositions have been proposed to obtain light weight and ornamentation. Also, roll roofing of the ordinary asphalt felt roofing material has been uniformly corrugated to obtain pleasing visual effects or where thickness was desired the corrugations have been filled with asphalt and the like to produce a thick but flat and uninteresting sheet.

While the aforesaid structures have produced advantages not contemplated in materials previous to them, inherently all possess the weakness that the exposed bituminous material of these products is exposed to the elements and to the sunlight and is susceptible to rapid deterioration, for it is known that such exposure causes condensation or polymerization of the bitumen, resulting in hardening with consequent checking or break-down of this material particularly where the bituminous material has been in the form of thin films or thin layers created by the processing operations. Constant exposure causes this material to shrink and even crumble and this together with the absorption of moisture causes deterioration of the whole product. Moreover the bitumen of the usual composition roofing material is obviously thermo-plastic at atmospheric temperatures and when exposed in the warm climates, softening and flow may occur so that where ornamentations have been created by embossing or corrugating, these have lost their prominence, due to settling of any raising portions, and, moreover, it has been impossible to tread upon such material without damaging the surface effects or the material itself. Also, the presence of moisture and volatile materials in the products which expand and are driven off at elevated temperatures produced by the absorption of heat from the sun's rays often is a source of blistering difficulties.

It is therefore the general object of the invention to provide materials and structures in which the aforesaid undesirable effects may be substantially eliminated or reduced to a minimum and in which the finished product is a novel structure possessing improved characteristics and other features not found in the prior materials.

An object of the invention is to provide building material with pleasing raised effects created by operating upon a sheet of flexible or mastic base material and which has been treated in a manner to substantially retain the formations created.

Another object of the invention is to create corrugations and other effects upon flexible base material in a manner to reduce to a minimum the stretch of the fibrous material of the base in the forming operations.

Another object of the invention is to create surface ornamentations upon building material by forming raised portions on the exposed face of a base and complementary recesses upon the opposite face of the base and filling in the recesses formed with a material suitable to maintain the surface effects created and provide substantial rigidity to the product.

A still further object of the invention is to form a corrugated sheet of roofing material wherein the peaks of the corrugations decrease in their distance from the plane of the base from the inner portion of the sheet to the edges.

Another object of the invention is to form tile simulating shingles and strips by forming raised portions upon a base and coating same with a fire and water resistant material.

These and other objectives of the invention will appear or be evident from the following description wherein details of construction and combination of steps are given to exemplify preferred embodiments thereof. In the description and in the claims certain specific terms, for instance, "raised portions", "corrugations", etc., are used for convenience in referring to the various details. It is to be understood, however, that these terms are to be interpreted as including all equivalents and as broadly as prior art will permit.

In the accompanying drawings wherein similar reference characterizes representative similar parts.

Figure 1 is a plan view of a piece of material designed for use as a shingle embodying features of our invention;

Figure 2 is a typical cross sectional view of the element of Figure 1 wherein the formed structure includes a cementitious layer;

Figure 3 is a typical cross sectional view of the structure of Figure 1 wherein the recesses at the back of the element have been filled;

Figure 4 is a plan view of a siding strip embodying features of our invention and having a cementitious surface coating;

Figure 5 is a side elevation of the formed base of the element of Figure 4, showing its characteristic surface formation and disclosing a partial application of surface coating material;

Figure 6 is a plan view of a serrated strip having surface formations;

Figure 7 is a cross sectional view of the element of Figure 6 taken at 7—7 of Figure 6;

Figure 8 is a plan view of an individual element having a plurality of surface formations similar to those of Figure 6;

Figure 9 shows an assembly of elements similar to that of Figure 6;

Figure 10 is an assembly of elements similar to those of Figure 6 wherein the elements are arranged in courses in staggered relation;

Figure 11 is a schematic side elevation of apparatus showing one manner of obtaining surface formations.

Figure 12 is a plan view of the apparatus of Figure 11 taken from above.

In carrying out our invention, we preferably use a flexible composition base 2. This may be the usual felted material made from vegetable fibres, wool, asbestos, or hair, alone, in combination, or with other extending material and provided in the form of a continuous sheet or web which may in the following operations be at any time moving or stationary. The invention, however, contemplates the use of smaller sections of material, for example the size of individual shingles or strips where this form of sheet is found preferable. The base is preferably saturated with a suitable waterproofing substance, for instance a low melting point asphalt and thereafter coated in the usual way with an additional adhesive coating 4, for instance a high melting point bitumen or one including resins of other character. Similar coating material may be applied to the opposite face and this may be only a skin coat where desired. To this coating, before it has set, may be applied and partially embedded a suitable substance to form a roughened surface. This may be a coating or mineral particles, for instance, crushed silica, quartz, brick, pebbles, slate, coke, glass, asbestos rock, ordinary sand or granulated vitrified materials. The granular material may be of the various sizes generally employed in the manufacture of roofing material and may comprise mixtures of several sizes, but for the purposes of this invention it is preferred that a small granule, for instance one about a #26 mesh, be used. Such more nearly covers the base adhesive and thereby provides more closely related anchoring points for a further coating. Also in shaping such a base the granules may be spread apart in certain places, for instance the peak positions of raised portions somewhat greater than the normal granule spacing and employment of a finer granule insures normal spacing at these points.

While not preferred the base may be one comprising a mastic composition for example one of bitumen and fibre and/or including other extending materials such as clay or silica. A granular layer may be anchored to the surface of such a base by a liquid adhesive coating comprising a synthetic resin composition, such as one including a phenolic resin, stearine pitch or blends of the two, as set forth in the Harshberger application Ser. No. 86,877, filed June 23, 1936. Further, the layer may be applied after the forming operations to be described are completed.

A base of the character described is subsequently formed with one or more raised surface portions or ridges or ribs and adjacent low areas, depressions or valleys. These may be located in the portions to be exposed to the weather or may extend over the entire surface of the base. The under surface of the base follows the general contour of the upper surface and forms a recess or recesses substantially mating with the upper surface. In this manner novel and pleasing surface configurations may be obtained using a thin layer of material. Moreover, massive appearing units may thus be obtained.

It will be noted that in the structures of Figs. 1–5 the surface formations which we characterize as ripples are made so that those at the center are further displaced from the plane of the base than those at the edges and that the vertical distance gradually decreases. Displacements of between $\frac{1}{16}$ to $\frac{1}{8}$ of an inch have been found to produce a very effective result whether simulating a grain effect or distinctive figures. However, we do not confine ourselves to these limits as the type and condition of material, the surface effect desired, and the mode of operation will have some bearing upon this factor. It also provides a tapered edge unit in the construction shown in Figs. 1–3. It will be understood that we do not limit ourselves to this particular type of surface formations for others such as distinct corrugations and localized raised effects as in Figs. 6–10 may be made.

The formed base embodying these features may be made by molding, pressing, or stamping with suitable dies or by means of mating rolls having interfitting high and low portions; for example annular ridges and recesses for corrugating.

Figs. 11 and 12 diagrammatically represent an apparatus adapted to produce the ripple effect referred to above. The method is preferred as it permits application upon a cold standard sheet of material and produces minimum stretch in the base. Additional effects such as shown in other figures of the drawings may be produced by modifying the means, for instance the rolls disclosed. In Figs. 11 and 12, the numeral 8 indicates a roller upon which a web 10 of base material, which may be mineral surfaced is wound. From such roller the web is laid over a roller 12 to a tank 14, containing hot water where it is submerged by the rolls 16 and 18. In this manner the asphalt of the base is somewhat warmed and annealed and the web is made more pliable. This operation also prevents cracking of the bitumen which is of a brittle nature when at normal temperature (75° F.). From the tank the web is led over a roll 20, to an initial set of forming rolls 22 and 24. The roll 24 has a central raised shoulder 26, for instance the width of the center raised portion of Fig. 4, and the roll 22, a mating recess 28 which allows for the thickness of material to be formed. The periphery of the shoulder may be central or may extend to the left or right as in a shaped cylindrical cam to produce an irregular surface effect. Thus the rolls 22 and 24 produce a center formation and the operation is one of drawing with a minimum of stretching, the portion of the web at the center being pressed and those on either side of the forming area being merely guided and permitted to slip toward the center to compensate for the change in width made necessary by the rise of material at the center. This operation is subsequently repeated by further sets of rolls such as 30 and 32 and 34 and 36 only that further formations more distant from the center of the web are made at each progressive operation. As many sets of rolls may be used as formations are to be made. Also more than a single formation or ripple may be made by one set of rolls though a greater extent of stretch may then be expected.

Following this operation the web so treated is directed to a coating device 38 where a surface layer 39 of a cementitious composition is applied over the formed base. The cementitious material used is preferably a hydraulic cement and may be, for example, an ordinary Portland cement, high early strength Portland, white cement, natural cement, magnesium cement, for example, magnesium oxychloride, but preferably comprises a high alumina cement containing between 60-95 percent of calcium aluminates or calcium alumina ferrites, particularly those made by fusion and when properly so made entirely free of free lime. The above cements may also be provided with quick setting characteristics in order to aid in certain cases in their proper curing. The compositions may also include extending materials such as marble dust, silica and mineral oxides or other coloring ingredients. In order to obtain a uniform coating over the formed base material and one that will stand the continous action of the weather, it is preferred that such material be impelled against the granular surface in the manner and by the means shown and described in Harshberger application Ser. No. 26,770, filed June 15, 1935.

Subsequently the formed and coated web may be severed as by the cutting unit 40, into individual sections and the coating permitted to set and/or harden. Where desired, however, the formed web may be severed into sections first and the cut sections thereafter individually coated. Where a hydraulic cement has been utilized it will, when hardened, provide a surfacing that will effectively seal in the under bituminous materials and permit the structure to withstand the continued actions of the weather. Moreover, a surface encasing shell is provided having high compressive strength that will resist any return of the base to the flat form and will when the coating thickness has been properly selected permit the raised portions to be tread upon without give or slip of the surface layer in warm climates. Coatings of 20 lbs. per 100 sq. ft. of surface and upward have been found satisfactory with many forms of surface effects. Furthermore the structure possesses great resistance to lifting and curling in the wind and therefore may be laid with large exposures to the weather. Also the surfacing is resistant to fire brands and erosion. Also the recesses on the backs of the formed elements create air pockets that aid in improving insulation of a surface.

Where extreme rigidity or other insulation characteristics are desired, the recess or recesses at the rear of the base may be filled with a suitable material 42 which may be any of tne foregoing or a porous composition comprising cork and/or vermiculite and/or glass wool, and/or shredded asbestos fibres and including a suitable binder, for example a synthetic resin, asphalt, or silicate of soda. Where cork is employed a structure with high insulating properties will result.

The foregoing construction may be made into many shapes and forms. Fig. 1 shows an individual element having a plurality of ripples stepping up toward the center. In this construction they are shown falling short of the upper part of the sheet to provide a flat surface for lapping in assembly. Fig. 2 shows a typical cross-section of this material illustrating the various layers and the back recess. Fig. 3 is a similar element to that of Fig. 2 but the recess is filled in. In this construction where desired the top coating 39 may be omitted.

Fig. 4 shows a novel form of siding strip which has upwardly projecting tabs 44 which in assembly back up the joints between overlying strips and, in combination with the cement coating 39, also increase the resistance of the strip to blowing or pulling up. The rigidity provided by these tabs likewise permit large exposure to be made as it is only necessary in assembly to position the lower edge of the strip slightly below the recesses between tabs. The surface of this strip is provided with vertical ripples and corrugations extending outwardly from a high area, the center. While in Fig. 5 these are shown with the backs 46 of the step facing in the same direction (the left in the figure) it is preferred that the step backs on one side of the center face to the left and those on the other side to the right.

In Figures 6-10 a further novel structure is disclosed having surface formations that will produce, when a plurality are arranged upon a surface, the effect of a multiplicity of overlapping curved tiles. Figures 6 and 7 indicate generally the formation of the raised surface configuration 48. From Fig. 6 it will be seen that the configuration has the form of the edge of a tile so that such an effect will be produced in assembly due to the shadow cast thereby. Fig. 7 shows how a transverse section through the edge simulating configuration appears.

The element structures of Figures 6-10 may be made by any of the previously described methods and may comprise similar base and coating materials. The top surfacing may also be one of hydraulic cement. In other words, any of the features ascribed to the construction of Figs. 2-4 may be incorporated in this construction. Fig. 6 illustrates a strip having a plurality of tabs. Any desired number may be provided. Fig. 8 illustrates an individual element with a plurality of tile edge configurations. It is desired that the flange positions of this element extend sufficiently beyond the ends of the configuration to provide a suitable lap for assembly. Fig. 9 illustrates a strip similar to those of Fig. 6, wherein the bottom edge of the tabs is straight instead of curved, arranged so that the tabs of overlying strips extend in vertical columns. Fig. 10 illustrates strips similar to that of Fig. 6, having narrow tabs of considerable depth to accentuate the tile effect. In this figure the tabs of overlying strips are staggered and the center of the curved lower edges of the tabs register with the upper edges of the slots between tabs of an underlying strip.

From the foregoing it will be seen that we have produced a novel and improved covering material and have presented novel processes for its fabrication. It will be obvious that various modifications may be made in the materials selected and constructions formed; also in the processes of using and producing them, without departing from the spirit of our invention which we desire to construe as broadly as the following claims taken in conjunction with the prior art may allow. The term, roofing, and similar expressions, as used in the claims and specifications are employed in a generic sense and are also intended to cover such applications as for walls, floors and the like. The details that have been given are for the purpose of illustration, not restriction.

We claim:

1. A surface covering product comprising a base, said base having a face with outwardly projecting portions to present a characteristic surface and having an opposite face substantially correspondingly indented, and said base having a rigidifying layer over the shaped portion of a face, the material of said base being such that the shaped portion would ordinarily be deformable and said rigidifying layer comprising a hardened and non-softening composition and being of sufficient thickness to rigidify said product and to substantially prevent said ordinary deformation of the shaped portion.

2. A surface covering product as claimed in claim 1, having a substantially water impervious base and a porous insulating filler material secured in the indented portions of the base.

3. A surface covering product comprising a base of material ordinarily deformable, said base being corrugated, said corrugations forming outwardly projecting portions on one face and substantially corresponding indentations upon the opposite face of said base, the projecting portions of adjacent corrugations being differently distant from a base plane, and there being a layer of a hardened and non-softening material over said corrugations whereby to rigidify said base and prevent ordinary deformation of said corrugations.

4. A surface covering product as claimed in claim 1, wherein the base is substantially of uniform thickness, and wherein the hardened and non-softening composition layer forms a continuous layer over the portion of the base to be exposed and maintains visually prominent the characteristic surface thereof.

5. Roofing and siding material comprising a base of pliable material ordinarily deformable, said base having a raised ripple-like surface and a substantially corresponding indented back, there being a coating comprising bitumen over said raised surface and a layer of granular material secured in said coating and there further being a continuous shape retaining and rigidifying coating comprising hydraulic cement over the granular material, said coatings and layers being arranged to maintain said ripple-like surface visually prominent and said hydraulic cement coating adapted to substantially prevent ordinary deformation of the shaped surface.

6. Roofing and siding material comprising a shaped body of fibrous sheet material, portions of said body projecting outwardly of the surface to be exposed, and creating a characteristic surface comprising said portions arranged in step-like fashion with adjacent steps differently distant from a base plane of the body, the rear surface of said body presenting indentations substantially corresponding to the exposed surface projections, and a continuous hardened and rigidifying coating comprising hydraulic cement over said exposed surface and maintaining visually prominent the characteristic surface of the body.

7. Roofing and siding as claimed in claim 6, wherein said plurality of raised portions are within the limits of a shingle size exposure.

8. A roofing and siding element comprising a body portion having side edges and a lower butt edge, and having a tab projection of substantial size and narrower than the main body portion extending from the upper edge of said body, said body comprising a material ordinarily deformable and having a plurality of raised rib-like projections extending upwardly from the lower edge of the element and into said tab projection, and said body having a rigidifying coating comprising a hardened and non-softening material over the exposed portion of said element and over said projecting tab.

9. A roofing and siding product comprising a fibrous base, said base having a projected portion outwardly of its surface to be exposed and adjacent the butt edge of said base simulating the thickened edge of a tile member and said projected portion having a substantially corresponding indentation upon its opposite base surface and said base having a rigidifying coating over the exposed surface maintaining visually prominent said surface projection, the material of said base being such that the shaped portion would ordinarily be deformable and said coating layer comprising a hardened hydraulic cement of sufficient thickness to rigidify the exposed portion of the product and to substantially resist said ordinary deformation of the shaped portion of the base, said base prior to shaping comprising a substantially flat fibrous sheet.

10. A roofing and siding product comprising a base, said base having a plurality of raised portions outwardly of the face in the portion to be exposed to the weather, and having substantially corresponding indentations upon the opposite face, the adjacent raised portions and indentations presenting substantially an irregular concave section and there being a substantially continuous rigidifying layer over the portion of the base to be exposed, the material of said base being such that the shaped portion would ordinarily be deformable and said rigidifying layer comprising a hardened and non-softening composition of sufficient thickness to substantially prevent said ordinary deformation of the raised portions and render said exposed portion substantially self-sustaining.

11. Roofing and siding comprising a base of readily deformable material, said base presenting a plurality of closely related projections presenting a characteristic surface and extending substantially the depth of the portion of said base to be exposed to the weather, and a further layer over said deformable base maintaining visually prominent the characteristic surface, said further layer comprising a hardened and non-softening composition of sufficient thickness to provide a rigidifying encasement to substantially prevent deformation of the characteristic surface and to rigidify said base.

NORMAN P. HARSHBERGER.
SIDNEY A. OCHS.